United States Patent
Warnant et al.

[11] 3,919,267
[45] Nov. 11, 1975

[54] 13β-ETHYL-17α-METHYL-18,19-DINOR-Δ$^{4,9}$-PREGNADIENE-3,20-DIONE

[75] Inventors: Julien Warnant, Neuilly-sur-Seine; Jean Jolly, Fontenay-sous-Bois, both of France

[73] Assignee: Roussel-UCLAF, Paris, France

[22] Filed: Oct. 23, 1974

[21] Appl. No.: 517,380

Related U.S. Application Data

[63] Continuation-in-part of Ser. No. 119,903, March 1, 1971, abandoned.

[30] Foreign Application Priority Data
Mar. 3, 1970  France .................. 70.07551

[52] U.S. Cl. ........ 260/397.3; 260/397.4; 260/397.5; 424/242
[51] Int. Cl.$^2$ .......................... A61K 31/56
[58] Field of Search .................. 260/397.3

[56] References Cited
UNITED STATES PATENTS

| | | |
|---|---|---|
| 3,277,122 | 10/1966 | Alvarez .................. 260/397.3 |
| 3,519,654 | 7/1970 | Bertin et al. ............ 260/397.3 X |
| 3,547,959 | 12/1970 | Joly et al. .............. 260/397.3 |
| 3,679,714 | 2/1972 | Warnant ................. 260/397.3 |

Primary Examiner—Ethel G. Love
Attorney, Agent, or Firm—Hammond & Littell

[57] ABSTRACT

13β-ethyl-17α-methyl-18,19-dinor-Δ$^{4,9}$-pregnadiene-3,20-dione of the formula

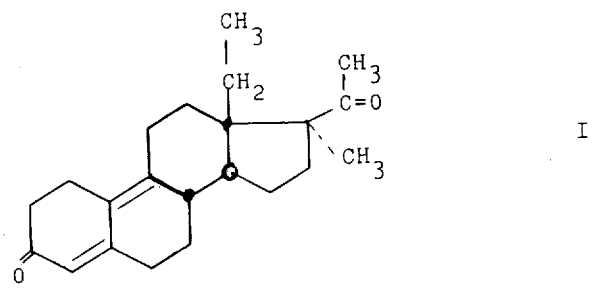

having excellent anti-androgenic activity and progestomimetic and anti-estrogenic activity and its preparation.

1 Claim, No Drawings ptember
13β-ETHYL-17α-METHYL-18,19-DINOR-Δ$^{4,9}$-PREGNADIENE-3,20-DIONE

PRIOR APPLICATION

This application is a continuation-in-part of copending, commonly assigned application Ser. No. 119,903 filed Mar. 1, 1971, now abandoned.

STATE OF THE ART

Various compounds possessing a 17α-methyl-Δ$^{4,9}$-gonadiene structure are known and it is also known that such a structure gives to norprogesterone a considerable increase in progestative and progestomimetic activity. 17α-methyl-19-nor-Δ$^{4,9}$-pregnadiene-3,20-dione possesses activity fifty times greater than progesterone and eight times greater than norprogesterone and also possesses a hypophysial inhibiting activity which is predominantly anti-L.H.

OBJECTS OF THE INVENTION

It is an object of the invention to provide the novel product, 13β-ethyl-17α-methyl-18,19-dinor-Δ$^{4,9}$-pregnadiene-3,20-dione.

It is another object of the invention to provide a novel process for the preparation of 13β-ethyl-17α-methyl-18,19-dinor-Δ$^{4,9}$-pregnadiene-3,20-dione.

It is a further object of the invention to provide novel anti-androgenic compositions.

It is an additional object of the invention to provide a novel method of inducing anti-androgenic activity in warm-blooded animals.

These and other objects and advantages of the invention will become obvious from the following detailed description.

THE INVENTION

The novel product of the invention is 13β-ethyl-17α-methyl-18,19-dinor-Δ$^{4,9}$-pregnadiene-3,20-dione which is the ethyl homolog of the known methyl compound. The 13β-ethyl compound retains the advantageous biological properties of the 13β-methyl compound while acquiring a clearly pronounced anti-androgenic activity. Moreover, the novel product has anti-estrogenic activity 9 times greater than the 13β-methyl compound and progestomimetic activity 2 times greater than the 13β-methyl compound.

The compound of the invention may be used in women for the treatment of troubles due to insufficient secretion of yellow body and in men for the treatment of manifestations due to excessive concentration of peripheric circulatory androgens such as acne, seborrhea and all manifestations of seborrhea. Thanks to the high peripheric anti-androgenic activity, it is possible to administer the product at a sufficiently low dose so as not to give rise to hypophysial inhibiting phenomena.

The process of the invention for the preparation of 13β-ethyl-17α-methyl-18,19-dinor-Δ$^{4,9}$-pregnadiene-3,20-dione comprises subjecting 13β-ethyl-17α-methyl-18,19-dinor-Δ$^{4,9}$-pregnadiene-20α-ol-3-one or 13β-ethyl-17α-methyl-18,19-dinor-Δ$^{4,9}$-pregnadiene-20β-ol-3-one or mixtures thereof to the action of an oxidizing agent to form the 3,20-dione of the invention. The preferred oxidizing agent is chromic acid anhydride and oxidation is effected in an acetone media in the presence of sulfuric acid.

The novel anti-androgenic compositions of the inventions are comprised of an effective amount of 13β-ethyl-17α-methyl-18,19-dinor-Δ$^{4,9}$-pregnadiene-3,20-dione and a pharmaceutical carrier. The compositions may be in the form of injectable solutions or suspensions in multiple dose flacons or ampoules, or in the form of tablets, coated tablets, capsules, syrups, suppositories or pommades. The usual individual dose is 0.25 to 10 mg for women and 0.5 to 20 mg for men. They may also contain one or more other active principles having similar activity.

The novel method of inducing anti-androgenic activity in warm-blooded animals comprises administering to warm-blooded animals an effective amount of 13β-ethyl-17α-methyl-18,19-dinor-Δ$^{4,9}$-pregnadiene-3,20-dione. The said product may be administered orally, transcutaneously, rectally or locally by topical application to skin or mucous. The usual daily dose is 0.008 to 0.166 mg/kg for women and 0.014 to 0.285 mg/kg for men depending upon the method of administration.

The starting material for the process of the invention, namely 13β-ethyl-17α-methyl-18,19-dinor-Δ$^{4,9}$-pregnadiene-20ξ-ol-3-one as mixtures or individual isomers, may be prepared by the process described in commonly assigned U.S. application Ser. No. 119,891 filed on even date herewith now U.S. Pat. No. 3,721,685 comprising reacting 3-methoxy-13β-ethyl-17α-acetyl-17β-acetoxy-Δ$^{1,3,5(10)}$-gonatriene with lithium in liquid ammonia and then a methylating agent to form 3-methoxy-13β-ethyl-17α-methyl-17β-acetyl-Δ$^{1,3,5(10)}$-gonatriene, subjecting the latter to the Birch reaction to obtain 3-methoxy-13β-ethyl-17α-methyl-18,19-dinor-Δ$^{2,5(10)}$-pregnadiene-20ξ-ol, treating the latter with a weak acid in an aqueous media to form 13β-ethyl-17α-methyl-18,19-dinor-Δ$^{5(10)}$-pregnen-20ξ-ol-3-one and reacting the latter with bromine or pyridinium perbromide in the presence of a dehydrobrominating agent.

In the following example there are described several preferred embodiments to illustrate the invention. However, it should be understood that the invention is not intended to be limited to the specific embodiments.

EXAMPLE

STEP A:

3-methoxy-13β-ethyl-17α-methyl-17β-acetyl-Δ$^{1,3,5(10)}$-gonatriene 0.348 g of lithium was added to 100 cc of liquid ammonia at −70°C under an inert atmosphere and after stirring for 10 minutes, 100 cc of tetrahydrofuran and then 6.7 g of 3-methoxy-13β-ethyl-17α-acetyl-17β-acetoxy-Δ$^{1,3,5(10)}$-gonatriene (described in published Netherland application No. 66-07588) were added to the reaction mixture.

The mixture was stirred for 4 hours at −70°C and after the addition of 26.8 cc of methyl iodide, the mixture was stirred for 2 hours at −70°C. The ammonia was removed by distillation and the mixture was then added to a mixture of water and ethyl ether and stirred. The organic phase was decanted off and the aqueous phase was extracted again with ethyl ether. The combined ether phases were washed with water, dried and concentrated to dryness by distillation under reduced pressure. The residue was crystallized from methanol to obtain 4.8 g of 3-methoxy-13β-ethyl-17α-methyl-17β-acetyl-Δ$^{1,3,5(10)}$-gonatriene melting at 127°C and having a specific rotation $[\alpha]_D$ = +42.5° (c=0.5% in chloroform).

STEP B:
3-methoxy-13β-ethyl-17α-methyl-18,19-dinor-Δ$^{2,5(10)}$-pregnadiene-20ξ-ol A solution of 3.15 g of 3-methoxy-13β-ethyl-17α-methyl-17β-acetyl-Δ$^{1,3,5(10)}$-gonatriene in 38 cc of tetrahydrofuran were added under an inert atmosphere to 53 cc of liquid ammonia at −40°C and after the addition of 1.6 cc of ethanol and then 0.34 g of lithium, the mixture was stirred for 15 minutes at −40°C. After a second addition of 1.6 cc of ethanol and then 0.34 g of lithium followed by stirring for 15 minutes at −35°C 4.7 cc of ethanol and then 0.34 g of lithium were added to the reaction mixture which was then stirred for 30 minutes at −35°C. 4.7 cc of ethanol were added to the mixture and the ammonia was removed by distillation. The reaction mixture was added to a mixture of ice and water and the aqueous phase was extracted with ethyl ether. The combined ether phases were washed with water and dried to obtain 3.15 g of product consisting mainly of a mixture of 3-methoxy-13β-ethyl-17α-methyl-18,19-Δ$^{2,5(10)}$-pregnadiene-20α-ol and 3-methoxy-13β-ethyl-17α-methyl-18,19-dinor-Δ$^{2,5(10)}$-pregnadiene-20β-ol.

STEP C:
13β-ethyl-17α-methyl-18,19-dinor-Δ$^{5(10)}$-pregnene-20α and 20β-ol-3-one The 3.15 gm of product from Step B were added under an inert atmosphere to 24.8 cc of methanol and then 3.1 cc of water and 3.15g of citric acid were added. The mixture was stirred for 4 hours at 20°C and the reaction mixture was added to a water-ice mixture. The precipitate formed was recovered by vacuum filtration and was washed and dried to obtain 2.95g of product consisting principally of 13β-ethyl-17α-methyl-18,19-dinorΔ$^{5(10)}$-pregnene - 20α-ol-3-one and 13β-ethyl-17α-methyl-18,19-dinor-Δ$^{5(10)}$-pregnene-20β-ol-3-one. The product was subjected to chromatography over silica gel to obtain the separate 20α and 20β-ol isomers.

STEP D:
13β-ethyl-17α-methyl-18,19-dinor-Δ$^{4,9}$-pregnadiene 20α-and 20β-ol-3-one 2.9g of the raw product obtained in Step C were dissolved under an inert atmosphere in 35 cc of pyridine and then 2.9g of pyridinium perbromide were added thereto over 40 minutes at −15°C. The mixture was stirred for 45 minutes at −15°C and then for 16 hours at 20°C. The reaction mixture was added to a mixture of ice, water and aqueous hydrochloric acid solution and the precipitate formed was recovered by vacuum filtration, was washed and dried to obtain 2.66g of raw product which by chromatography over silica gel was separated into 13β-ethyl-17α-methyl-18, 19-dinor-Δ$^{4,9}$-pregnadiene-20α-ol-3-one and 13β-ethyl-17α-methyl-18,19-dinor-Δ$^{4,9}$-pregnadiene-20β-ol-3-one.

STEP E: 13β-ethyl-17α-methyl-18, 19-dinor-Δ$^{4,9}$-pregnadiene-3, 20-dione 1g of chromic acid and 1cc of concentrated sulfuric acid were added to sufficient water to obtain a final volume of 10 cc (product A). 2.1g of the raw product obtained in step D were dissolved under an inert atmosphere in 20 volumes of acetone and then 6.3 cc of product A were added thereto while maintaining the temperature at 22°–24°C. The mixture was stirred for 10 minutes and was then added to water. The acetone was distilled off and the mixture was returned to room temperature and was extracted with methylene chloride. The organic phases were washed with water until the wash waters were neutral, dried over sodium sulfate and vacuum filtered. The methylene chloride filtrate was added to 4.2g of alumina and was vacuum filtered. The filter was washed with methylene chloride and the filtrate was distilled to dryness under reduced pressure. The oily residue was taken up in 10 cc of isopropyl ether and the mixture was allowed to stand overnight in a refrigerator. The insoluble oil was decanted off and the isopropyl ether solution was concentrated. The residue was subjected to chromatography with elution with a 7:3 mixture of benzeneethyl acetate to obtain 0.67g of residue. The residue was taken up in 1.8 cc of isopropyl ether and the solution was refluxed for 5 minutes and then iced for 1 hour. The mixture was vacuum filtered and the precipitate was washed with iced isopropyl ether and dried under vacuum to obtain 0.465g of raw product which was purified by crystallization from hot and cold isopropyl ether to obtain 0.32g of 13β-ethyl-17α-methyl-18,19-dinor-Δ$^{4,9}$-pregnadiene-3,20-dione in the form of colorless crystals melting at 130°C and having a specific rotation $[\alpha]_D^{20} = -265°\pm 4.5$ (c=0.45% in ethanol). The product was soluble in ether and insoluble in water.

Analysis: $C_{22}H_{30}O_2$; molecular weight = 326.46: Calculated: %C, 80.93; %H, 9.26. Found: %C, 80.7; %H, 9.4.

UV Spectrum

Max. at 214–215 mμ; $E_{1cm}^{1\%} = 200$.

Inflex. towards 233 mμ; $E_{1cm}^{1\%} = 155$.

Max. at 304–305 mμ; $E_{1cm}^{1\%} = 633$ or E = 20, 650.

As far as is known, this product is not described in the literature.

PHARMACOLOGICAL STUDY

A. Anti-Gonadotrophic Activity

The anti-gonadotrophic activity was determined on puberic rats weighing about 200 grams by subcutaneously administering the test compounds in solution in sesame oil containing 5% benzylic alcohol. The animals received a unit volume of 0.2 cc in 12 treatments over 14 days at daily dosages of 2 mg per animal. On the fifteenth day, the animals were sacrificed by carotidiene bleeding and the seminal vesicles, prostate, testicles and surrenals were retained and weighed. The results are given in Table I.

TABLE I

| | Daily Dose | Testicles in mg | Seminal Vesicles in mg | Prostate in mg | Surrenals in mg |
|---|---|---|---|---|---|
| Controls | 0 | 2806 | 858 | 519 | 50.2 |
| 13β-ethyl-17α-methyl-18,19-dinor-Δ4,9-pregnadiene-3,20-dione | 2 mg | 2862 | 192 (−77%) | 327 (−37%) | 50.4 |

The results of Table I show that the product possesses an antigonadotrophic activity which is predominantly anti LH and which does not provoke surrenalism aplasia.

B. Exogenic Anti-Androgenic Activity

The exogenic anti-androgenic activity was determined against testosterone propionate in castrated male rats in the Lerner method described by Dorman in METHODS IN HORMONE RESEARCH, Vol. II, P. 320. Young male rats about 4 weeks old were castrated and treatment was started the day after the castration and continued for 7 days.

On the eighth day, the animals were killed and the relevant organs, namely prostate, seminal vesicles and levator ani, were recovered. 13$\beta$-ethyl-17$\alpha$-methyl-18,19-dinor-$\Delta^{4,9}$-pregnadiene-3,20-dione and testosterone propionate were administered in sesame oil containing 5% benzylic alcohol and they were administered separately subcutaneously, the test compound being administered at 1 mg per rat and per day and testosterone propionate at 50$\gamma$ per rat and per day. One group of rats serving as the control received only the solvent, one group received 50$\gamma$ of testosterone propionate, one group received 1 mg of the test compound and 1 group received 1 mg of the test product and 50$\gamma$ of testosterone propionate. The results are reported in Table II.

TABLE II

| Group | Daily Dose | Fresh Levator Anti in mg | Seminal Vesicles in mg | Prostate in mg |
|---|---|---|---|---|
| Controls | 0 | 18.0 | 7.6 | 11.1 |
| Testosterone Propionate | 50$\gamma$ | 41.2 | 61.6 | 83.8 |
| Product | 1 mg | 27.0 | 7.1 | 9.9 |
| Product + Testosterone Propionate | 1 mg +50$\gamma$ | 33.1 (−20%) | 26.6 (−57%) | 47.5 (−44%) |

The results show that the compound of the invention exercises very important exogenic anti-androgenic activity at a dose of 1.0 mg against a dose of 50$\gamma$ of testosterone propionate without manifesting an androgenic activity, when administered alone.

C. Antiestrogenic Activity

The antiestrogenic activity was determined on immature mice by a technique inspired by the test of Rubin [Endo., Vol. 49 (1951), p. 429] and similar to that of Dorfman et al. [Methods in Hormone Research, Vol. II, 1962, p. 118]. Groups of 4 mice 19 to 21 days old received daily subcutaneously for 3 days an injection of estradiol alone, an injection of the test product alone or an injection of estradiol and the test product. In the last case, the two steroids were injected at different points. The animals were killed on the fourth day and the uterus was removed and weighed.

The estradiol in solution in sesame oil containing 5% benzylic alcohol was administered at a total dose of 0.27$\gamma$, each injection having a volume of 0.1 cc per mouse. The test compound in solution in sesame oil containing 5% benzylic alcohol was administered to two lots of mice at total doses of 90$\gamma$ and 810$\gamma$ each injection having also a volume of 0.1 cc per mouse. The results are reported in Table III.

TABLE III

| Groups | Doses | Average Weight of Uterus in mg |
|---|---|---|
| Controls | 0 | 8.9 |
| Estradiol | 0.27$\gamma$ | 73.7 |
| Test product | 90$\gamma$ | 17.5 |
| Test Product + estradiol | 90$\gamma$ + 0.27$\gamma$ | 26.6 (−64%) |
| Test Product | 810$\gamma$ | 18.4 |
| Test Product + Estradiol | 810$\gamma$ + 0.27$\gamma$ | 25.5 (−66%) |

The results of Table III shows that the test product possesses an anti-estrogenic activity against estradiol at a very low dose.

D. Progestomimetic Activity

The progestomimetic activity was determined by the Clauberg test on immature rabbits previously sensitized by subcutaneous administration of estradiol benzoate for 5 days at a daily dose of 10$\gamma$. The animals received daily for 5 days a subcutaneous administration of 13$\beta$-ethyl-17$\alpha$-methyl-18,19-dinor-$\Delta^{4,9}$-pregnadiene-3,20-dione in solution in sesame oil containing 5% benzylic alcohol at daily doses of 1.56$\gamma$, 3.12$\gamma$, and 6.25$\gamma$. The animals were sacrificed on the 6th day and slices of the uterus were examined for lacy endometric proliferation characteristic of progestomimetic activity. The results, in MacPhail units, are shown in Table IV.

TABLE IV

| Daily Doses in $\gamma$ | MacPhail Units |
|---|---|
| 1.56 | 2.2 |
| 3.12 | 2.2 |
| 6.25 | 2.4 |

The results of Table IV show that the test product has an important progestomimetic activity at a daily dose of 1.56$\gamma$ which is superior to that of 6-chloro-17$\alpha$-acetoxy-$\Delta^{4,6}$-pregnadiene-3,20-dione and 17$\alpha$-methyl-19-nor-$\Delta^{4,9}$-pregnadiene-3,20-dione.

The following tests were conducted with compound B being 13$\beta$, 17$\alpha$-dimethyl-18,19-dinor-$\Delta^{4,9}$-pregnadiene-3,20-dione and compound A being -ethyl-17$\alpha$-methyl-18,19-dinor-$\Delta^{4,9}$-pregnadiene-3,20-dione.

COMPARATIVE PHARMACOLOGICAL STUDY

A. Anti-Gonadotrophic Activity

The anti-gonadotrophic activity was determined on puberic rats weighing about 200 grams by subcutaneously administering the test compounds in solution in sesame oil containing 5% benzylic alcohol. The animals received a unit volume of 0.2 cc in 12 treatments over 14 days at daily dosages of 2 mg per animal. On the fifteenth day, the animals were sacrificed by carotidiene bleeding and the seminal vesicles, prostate, testicles and surrenals were retained and weighed. The results are given in Table V.

TABLE V

|  | Doses in mg | Weight of testicles in mg | Weight of seminal vesicles in mg | Weight of prostate | Weight of surrenals |
|---|---|---|---|---|---|
| Controls | 0 | 2597 | 789 | 317 | 40.7 |
| Compound B | 2 | 2726 | 237 (−70%) | 248 (−22%) | 49.9 |
| Controls | 0 | 2806 | 858 | 519 | 50.2 |
| Compound A | 2 | 2862 | 192 (−77%) | 327 (−37%) | 50.4 |

The antigonadotrophic activity of compounds A and B is essentially the same as seen from Table V.

B. Exogenic Anti-Androgenic Activity

The exogenic anti-androgenic activity was determined against testosterone propionate in castrated male rats in the Lerner method described by Dorfman in METHODS IN HORMONE RESEARCH, Vol. II, P. 320. Young male rats about 4 weeks old were castrated and treatment was started the day after the castration and continued for 7 days.

On the eighth day, the animals were killed and the relevant organs, namely prostate, seminal vesicles and levator ani, were recovered. Compound A or Compound B and testosterone propionate were administered in sesame oil containing 5% benzylic alcohol and they were administered separately subcutaneously, the test compound being administered at 1 mg per rat and per day and testosterone propionate at 50γ per rat and per day. One group of rats serving as the control received only the solvent, one group received 50γ of testosterone propionate, one group received 1 mg of the test compound and 1 group received 1 mg of the test product and 50γ of testosterone propionate. The results are reported in Table VI.

TABLE VI

| Group | Fresh Levator Anti in mg | Seminal Vesicles in mg | Prostate in mg |
|---|---|---|---|
| Controls | 20.8 | 8.7 | 18.5 |
| 50γ of testosterone propionate | 34.2 | 67.5 | 111.5 |
| 1 mg of Compound B | 24.3 | 9.4 | 15.5 |
| Compound B 1 mg & 50γ of testosterone propionate | 31.7 | 47.9 (−29%) | 89.0 (−20%) |

| Group | Fresh Levator Anti in mg | Vesicles in mg | Prostate in mg |
|---|---|---|---|
| Controls | 18.0 | 7.6 | 11.1 |
| 50γ of testosterone propionate | 41.2 | 61.6 | 83.8 |
| Product A 1 mg | 27.0 | 7.1 | 9.8 |
| Product A 1 mg & 50 of testosterone propionate | 33.1 (−20%) | 26.6 (−57%) | 47.5 (−44%) |

The results of Table VI show that the anti-androgenic activity of compounds A is substantially higher. However this difference is not large enough to authorize any possibility of valid statistical differentation.

C. Anti-estrogenic Activity

The anti-estrogenic activity was determined on immature mice by a technique inspired by the test of Rubin [Endo., Vol. 49 (1951), p. 429] and similar to that of Dorfman et al [Methods of Hormone Research, Vol. II, (1962), p. 118]. Groups of 4 mice 19 to 21 days old received daily subcutaneously for three days an injection of estradiol alone, an injection of the test product alone or an injection of estradiol and the test product. In the last case, the two steroids were injected at different points. The animals were killed on the fourth day and the uterus was removed and weighed.

The estradiol in solution in sesame oil containing 5% benzylic alcohol was administered at a total dose of 0.27γ each injection having a volume of 0.1 cc per mouse. The test compound in solution in sesame oil containing 5% benzylic alcohol was administered to two lots of mice at total doses of 90γ and 810γ each injection having also a volume of 0.1 cc per mouse. The results are reported in Table VII.

TABLE VII

| Products | Doses | Average weight of uterus in mg | % of inhibition |
|---|---|---|---|
| Compound B | 0 | 17.1 ∓ 0.9 |  |
| Estradiol | 0.27γ | 58.1 ∓ 7.5 |  |
| Compound B | 3.3γ | 12.7 ∓ 1.7 |  |
| Compound B (+ estradiol) | ( 3.3γ (+0.27γ | 51.1 ∓ 2.0 | 12% |
| Compound B | 10γ | 15.4 ∓ 1.6 |  |
| Compound B (+ estradiol) | ( 10γ (+0.27γ | 42.8 ∓ 2.8 | 26% |
| Compound B | 30γ | 14.7 ∓ 1.4 |  |
| Compound B (+ estradiol) | 30γ 0.27γ | 34.9 ∓ 5.7 | 40% |
| Compound A | 1.1γ | 17.1 ∓ 1.3 |  |
| Compound A (+ estradiol | ( 1.1γ (+0.27γ | 48.4 ∓ 2.3 | 12% |
| Compound A | 3.3γ | 19.9 ∓ 1.4 |  |
| Compound A (+ estradiol) | ( 3.3γ ( 0.27γ | 37.0 ∓ 2.1 | 36% |
| Compound A | 10γ | 18.8 ∓ 1.1 |  |
| Compound A (+ estradiol) | ( 10γ (+0.27γ | 26.8 ∓ 1.6 | 54% |

Table VII shows that the anti-estrogenic activity of compound A is considerably superior to compound B at a dose of 3.3γ and is comparable to a dose of 30γ of compound B against 0.27γ of estradiol. This action is more than 9 times greater than the 13 methyl homolog.

D. Progestomimetic Activity

The progestomimetic activity was determined by the Clauberg test on immature rabbits previously sensitized by subcutaneous administration of estradiol benzoate for 5 days at a daily dose of 10γ. The animals received daily for 5 days a subcutaneous administration of compound A or B in solution in sesame oil containing 5% benzylic alcohol at daily doses of 1.56γ, 3.12γ, and 6.25γ. The animals were sacrificed on the 6th day and slices of the uterus were examined for lacy endometric proliferation characteristics of progestomimetic activity. The results, in MacPhail units, are shown in Table VIII.

TABLE VIII

| Product | Daily Doses in γ | MacPhail Units |
|---|---|---|
| Compound B | 1.56 | 1.3 |
|  | 3.12 | 2.0 |
|  | 6.25 | 2.4 |
| Compound A | 1.56 | 2.2 |
|  | 3.12 | 2.2 |
|  | 6.25 | 2.4 |

The results of Table VIII show that the progestomimetic activity of compound A is about twice as great as that of compound B.

Various modifications of the compositions and method of the invention may be made without departing from the spirit or scope thereof and it is to be understood that the invention is intended to be limited only as defined in the appended claims.

We claim:
1. 13$\beta$-ethyl-17$\alpha$-methyl-18,19-dinor-$\Delta^{4,9}$-pregnadiene-3,20-dione.